US012811250B2

(12) United States Patent
Miyamae et al.

(10) Patent No.: US 12,811,250 B2
(45) Date of Patent: Nov. 24, 2026

(54) LITHIUM SECONDARY BATTERY

(71) Applicant: Panasonic Intellectual Property Management Co., Ltd., Osaka (JP)

(72) Inventors: Ryohei Miyamae, Osaka Fu (JP); Akira Kano, Osaka Fu (JP); Shinichiro Kondo, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 419 days.

(21) Appl. No.: 18/696,828

(22) PCT Filed: Sep. 22, 2022

(86) PCT No.: PCT/JP2022/035299
§ 371 (c)(1),
(2) Date: Mar. 28, 2024

(87) PCT Pub. No.: WO2023/054148
PCT Pub. Date: Apr. 6, 2023

(65) Prior Publication Data

US 2024/0405373 A1 Dec. 5, 2024

(30) Foreign Application Priority Data

Sep. 30, 2021 (JP) ................................ 2021-162236

(51) Int. Cl.
*H01M 2/16* (2006.01)
*H01M 4/38* (2006.01)
(Continued)

(52) U.S. Cl.
CPC ......... *H01M 50/457* (2021.01); *H01M 4/382* (2013.01); *H01M 10/052* (2013.01);
(Continued)

(58) Field of Classification Search
CPC ............ H01M 50/457; H01M 50/414; H01M 50/463; H01M 50/446; H01M 50/443;
(Continued)

(56) References Cited

U.S. PATENT DOCUMENTS 6,703,158 B1 * 3/2004 Hirano ................ H01M 50/167 429/94
2010/0112434 A1 * 5/2010 Akou .................. H01M 50/534 429/174
(Continued)

FOREIGN PATENT DOCUMENTS

EP 2978046 A1 1/2016
EP 4254581 A1 10/2023
(Continued)

OTHER PUBLICATIONS

International Search Report dated Nov. 8, 2022 issued in International Patent Application No. PCT/JP2022/035299, with English translation.
(Continued)

*Primary Examiner* — Raymond Alejandro
(74) *Attorney, Agent, or Firm* — Rimon P.C.

(57) ABSTRACT

A disclosed lithium secondary battery includes a positive electrode, a negative electrode, a separator disposed between the positive electrode and the negative electrode, and a non-aqueous electrolyte having lithium ion conductivity. The negative electrode is an electrode on which lithium metal is deposited during charging and from which the lithium metal dissolves during discharging. The separator includes a substrate, a heat-resistant layer, and a spacer. The heat-resistant layer is formed on at least one main surface selected from two main surfaces of the substrate. The spacer is disposed on the positive electrode side with respect to the substrate and the heat-resistant layer. An average height of
(Continued)

the spacer is larger than a sum of an average thickness of the substrate and an average thickness of the heat-resistant layer.

13 Claims, 3 Drawing Sheets

(51) Int. Cl.

| | |
|---|---|
| ***H01M 10/052*** | (2010.01) |
| ***H01M 10/42*** | (2006.01) |
| ***H01M 50/414*** | (2021.01) |
| ***H01M 50/431*** | (2021.01) |
| ***H01M 50/443*** | (2021.01) |
| ***H01M 50/446*** | (2021.01) |
| ***H01M 50/451*** | (2021.01) |
| ***H01M 50/457*** | (2021.01) |
| ***H01M 50/463*** | (2021.01) |

(52) U.S. Cl.
CPC ..... *H01M 10/4235* (2013.01); *H01M 50/414* (2021.01); *H01M 50/431* (2021.01); *H01M 50/443* (2021.01); *H01M 50/446* (2021.01); *H01M 50/451* (2021.01); *H01M 50/463* (2021.01)

(58) Field of Classification Search
CPC ............. H01M 50/451; H01M 50/431; H01M 10/052; H01M 10/0525; H01M 10/4235; H01M 4/382
See application file for complete search history.

(56) References Cited

U.S. PATENT DOCUMENTS

| | | | |
|---|---|---|---|
| 2016/0285064 A1 | 9/2016 | Hatta et al. | |
| 2020/0203695 A1 | 6/2020 | Baba et al. | |
| 2021/0265617 A1 | 8/2021 | Okano et al. | |
| 2021/0399373 A1* | 12/2021 | Ko ...................... | H01M 50/197 |
| 2023/0032198 A1 | 2/2023 | Sadakane et al. | |
| 2023/0042242 A1 | 2/2023 | Sadakane et al. | |
| 2024/0021907 A1 | 1/2024 | Murayama et al. | |
| 2024/0194951 A1 | 6/2024 | Fukuoka et al. | |

FOREIGN PATENT DOCUMENTS

| | | |
|---|---|---|
| EP | 4329044 A1 | 2/2024 |
| WO | 2020/066254 A1 | 4/2020 |
| WO | 2021/131533 A1 | 7/2021 |
| WO | 2021/131534 A1 | 7/2021 |

OTHER PUBLICATIONS

Partial Supplemental European Search Report dated Jan. 27, 2025 issued in the corresponding European Patent Application No. 22876015.3.

* cited by examiner

LITHIUM SECONDARY BATTERY

This application is the U.S. National Phase under 35 U.S.C. § 371 of International Patent Application No. PCT/JP2022/035299, filed on Sep. 22, 2022, which in turn claims the benefit of Japanese Patent Application No. 2021-162236, filed on Sep. 30, 2021, the entire disclosures of which Applications are incorporated by reference herein.

TECHNICAL FIELD

The present disclosure relates to a lithium secondary battery.

BACKGROUND ART

Non-aqueous electrolyte secondary batteries are used for ICTs for personal computers and smart phones, in-vehicle applications, power storage applications, etc. There is demand for further increase in the capacity of non-aqueous electrolyte secondary batteries in these applications. Lithium ion batteries are known as high-capacity non-aqueous electrolyte secondary batteries. It is possible to increase the capacity of a lithium ion battery by using a combination of graphite and an alloy active material such as a silicon compound, as a negative electrode active material, for example. However, the increase in the capacity of lithium ion batteries is approaching the limit.

Lithium secondary batteries (lithium metal secondary batteries) are promising as non-aqueous electrolyte secondary batteries superior in capacity to lithium ion batteries. In a lithium secondary battery, lithium metal is deposited on the negative electrode during charging, and the lithium metal dissolves in the non-aqueous electrolyte during discharging. Various proposals have been conventionally made on lithium secondary batteries.

Patent Literature 1 (WO 2020/066254) discloses "a lithium secondary battery, comprising: a positive electrode including a positive electrode current collector, and a positive electrode mixture layer containing a positive electrode active material; a negative electrode including a negative electrode current collector that faces the positive electrode; a separator disposed between the positive electrode and the negative electrode; and a non-aqueous electrolyte having lithium ion conductivity, wherein the positive electrode active material includes a composite oxide containing lithium and a metal M other than lithium, the metal M containing at least a transition metal, lithium metal deposits on the negative electrode during charge, and the lithium metal dissolves from the negative electrode during discharge, the positive electrode current collector has a first length in a first direction D1 and a second length in a second direction D2 intersecting the first direction, the first length being shorter than the second length, a spacer is provided between the positive electrode and the separator so as to form a space for storing the lithium metal, between the positive electrode and the negative electrode, and a straight line SL is drawable along the first direction D1 so as to pass through three or more points of the spacer."

CITATION LIST

Patent Literature

PTL1: WO 2020/066254

SUMMARY OF INVENTION

Technical Problem

Nowadays, further improvement in characteristics of lithium secondary batteries are required. An object of the present disclosure is to provide a lithium secondary battery that has improved characteristics (e.g., safety).

Solution to Problem

One aspect of the present disclosure relates to a lithium secondary battery. The lithium secondary battery includes a positive electrode, a negative electrode, a separator disposed between the positive electrode and the negative electrode, and a non-aqueous electrolyte having lithium ion conductivity, wherein the negative electrode is an electrode on which lithium metal is deposited during charging and from which the lithium metal dissolves during discharging, the separator includes a substrate, a heat-resistant layer, and a spacer, the heat-resistant layer is formed on at least one main surface selected from two main surfaces of the substrate, the spacer is disposed on the positive electrode side with respect to the substrate and the heat-resistant layer, and an average height of the spacer is larger than a sum of an average thickness of the substrate and an average thickness of the heat-resistant layer.

Advantageous Effects of Invention

According to the present disclosure, it is possible to obtain a lithium secondary battery having improved characteristics (e.g., safety).

Although novel features of the present invention are described in the appended claims, the following detailed description referring to the drawings will facilitate the understanding of both the configuration and content of the present invention together with other objects and features of the present invention.

DESCRIPTION OF EMBODIMENTS

Figure 1:
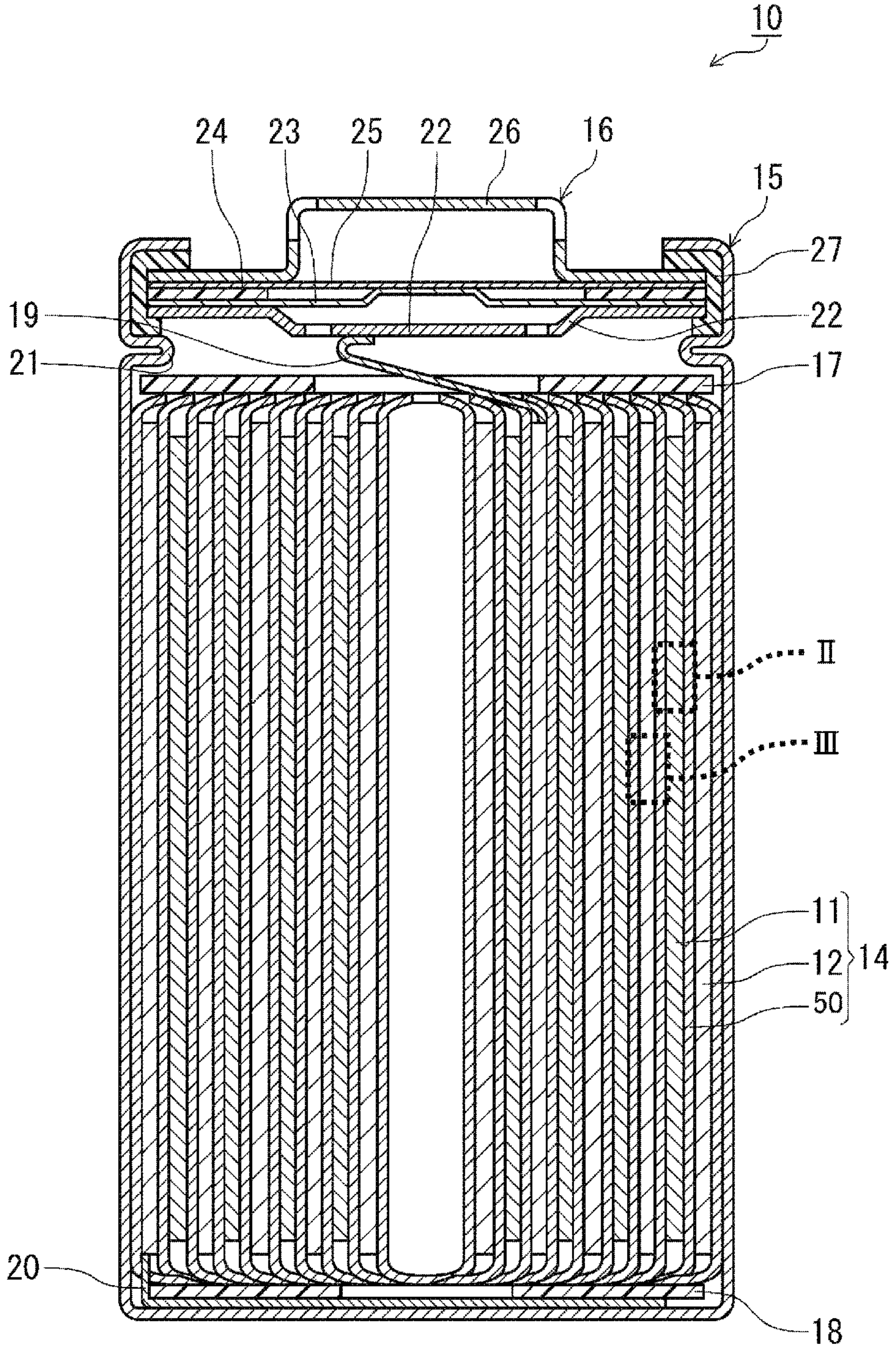
FIG. 1 A schematic longitudinal cross-sectional view of an example of a lithium secondary battery according to an embodiment of the present disclosure.

The following describes examples of embodiments according to the present disclosure, but embodiments according to the present disclosure are not limited to the following examples. In the following description, specific numerical values and materials are described as examples, but it is possible to apply other numerical values and materials as long as the invention according to the present disclosure can be implemented. In the present specification, the wording "from a numerical value A to a numerical value B" refers to a range that includes the numerical values A and B, and can be read as "the numerical value A or more and the numerical value B or less". When examples of a lower limit value and examples of an upper limit value are described below regarding a specific physical property or condition, any of the examples of the lower limit value and the examples of the upper limit value can be combined unless the lower limit value is larger than or equal to the upper limit value.

(Lithium Secondary Battery)

A lithium secondary battery according to an embodiment of the present disclosure (hereinafter may be referred to as a "lithium secondary battery (L)") includes a positive electrode, a negative electrode, a separator disposed between the positive electrode and the negative electrode, and a non-aqueous electrolyte having lithium ion conductivity. The negative electrode is an electrode on which lithium metal is deposited during charging and from which the lithium metal dissolves during discharging. The separator includes a substrate, a heat-resistant layer, and a spacer. The heat-resistant layer is formed on at least one main surface selected from two main surfaces of the substrate. The spacer is disposed on the positive electrode side with respect to the substrate and the heat-resistant layer. An average height of the spacer is larger than a sum of an average thickness of the substrate and an average thickness of the heat-resistant layer.

In the present specification, a configuration in which an element B is formed on an element A encompasses a configuration in which the element B is formed directly on the element A and a configuration in which the element B is formed on the element A with another element arranged between the elements A and B.

The lithium secondary battery (L) is also called a lithium metal secondary battery. In this type of battery, lithium metal is deposited on the negative electrode during charging, and the lithium metal dissolves from the negative electrode during discharging. Specifically, the negative electrode includes at least a negative electrode current collector, and the lithium metal is deposited on the negative electrode current collector.

In the lithium secondary battery (L), for example, 70% or more of the rated capacity is exhibited through deposition and dissolution of the lithium metal. Movement of electrons at the negative electrode during charging and discharging occurs mainly due to the lithium metal being deposited on the negative electrode and dissolving from the negative electrode. Specifically, 70% to 100% (e.g., 80% to 100% or 90% to 100%) of the movement of electrons (from a different viewpoint, a current) that occurs at the negative electrode during charging and discharging is due to deposition and dissolution of the lithium metal. That is, the negative electrode according to the present disclosure differs from a negative electrode at which movement of electrons during charging and discharging occurs mainly due to lithium ions being absorbed and released by a negative electrode active material (e.g., graphite).

In the following description, the positive electrode, the negative electrode, and the separator may be collectively referred to as an "electrode group". The positive electrode, the negative electrode, and the separator may be wound with the separator arranged between the positive electrode and the negative electrode. In the formation of a wound electrode group, a belt-like positive electrode, a belt-like negative electrode, and a belt-like separator are used. Alternatively, the positive electrode, the negative electrode, and the separator may be stacked on each other. For example, a flat positive electrode, a flat negative electrode, and a flat separator may be stacked on each other. That is, the electrode group may be a wound electrode group or a stacked electrode group.

In the lithium secondary battery (L), spaces are secured between the positive electrode and the negative electrode by the spacer. The spacer is disposed on the positive electrode side of the separator and forms the spaces on a surface of the positive electrode. Lithium metal is deposited on a surface of the negative electrode during charging. Due to the deposited lithium metal, the separator moves toward the positive electrode in portions that are not provided with the spacer. Regions in which the spacer is not present are spaces, and therefore, the separator (the substrate and the heat-resistant layer) can move toward the positive electrode in those regions. Accordingly, expansion of the electrode group can be suppressed when charging and discharging are repeated. Also, in the lithium secondary battery (L), the substrate or the heat-resistant layer is present on the surface of the negative electrode. Therefore, it is possible to suppress coarse deposition of lithium metal. Accordingly, expansion of the negative electrode can be suppressed.

Furthermore, the separator included in the lithium secondary battery (L) includes the heat-resistant layer formed on a surface of the substrate. The heat-resistant layer can suppress contraction of the substrate when the temperature of the electrode group has excessively increased. If the substrate contracts, a short circuit is likely to occur between the positive electrode and the negative electrode due to the contraction of the substrate, and therefore, the temperature of the electrode group is likely to further increase. Since the separator includes the heat-resistant layer, contraction of the substrate can be suppressed, and accordingly, a further increase in the temperature of the electrode group can be suppressed.

Moreover, the separator includes the spacer. The inventors of the present invention newly found through studies that the spacer not only secures spaces between the electrode plates but also significantly increases an effect of suppressing an excessive increase in the temperature of the electrode group when the spacer is used in combination with the heat-resistant layer. The present disclosure is based on this finding. At present, it is not clear why the above effect can be obtained by using the heat-resistant layer and the spacer in combination. However, the effect of suppressing thermal contraction of the substrate, which is obtained with use of the heat-resistant layer, may be significantly increased by the spacer.

Also, if the spacer is disposed on the positive electrode, the spacer covers the surface of the positive electrode, and therefore, transfer of lithium ions by a positive electrode active material is partially hindered. Consequently, the cell capacity may decrease. However, in the lithium secondary battery (L), the spacer is formed on the separator, and therefore, the above problem can be avoided. That is, in the lithium secondary battery (L), it is possible to suppress expansion of the electrode group and maintain a high cell capacity at the same time, and furthermore, it is possible to suppress an increase in the temperature of the battery in the event of an abnormality.

By disposing the heat-resistant layer on the positive electrode side, it is possible to suppress deterioration of the substrate due to an oxidation reaction. On the other hand, by disposing the heat-resistant layer on the negative electrode side, it is possible to suppress deterioration of the substrate due to a reduction reaction.

If a space is formed on the surface of the negative electrode by the spacer, lithium metal is freely deposited on the surface of the negative electrode and dissolves from the surface during charging and discharging. Consequently, a short circuit due to dendrites may be likely to occur or the occurrence of a side reaction may be likely to increase due to an increase in the surface area of the negative electrode. An increase in the occurrence of a side reaction leads to a reduction in the capacity retention rate. On the other hand, in the lithium secondary battery (L), the spacer is disposed on the positive electrode side, and accordingly, no space is formed on the surface of the negative electrode by the spacer. Therefore, the lithium secondary battery (L) can have high reliability and a high capacity retention rate.

The separator includes at least one heat-resistant layer. The heat-resistant layer may be formed on the positive electrode side main surface of the two main surfaces of the substrate, or on the negative electrode side main surface, or on each of the two main surfaces. The spacer may be formed on the heat-resistant layer, or on the substrate without the heat-resistant layer being arranged between the substrate and the spacer. For example, the separator may have a configuration constituted of the substrate/the heat-resistant layer/the spacer, a configuration constituted of the heat-resistant layer/the substrate/the spacer, or a configuration constituted of the heat-resistant layer/the substrate/the heat-resistant layer/the spacer. In these configurations, the spacer is disposed on the positive electrode side. That is, the separator is disposed in such a manner that the spacer faces the positive electrode. In an example, the heat-resistant layer is formed on the positive electrode side main surface of the two main surfaces of the substrate, and the spacer is formed on the heat-resistant layer. When the spacer is formed on the heat-resistant layer, a particularly high effect of suppressing thermal contraction of the substrate can be obtained.

(Substrate)

A porous sheet that has ion permeability and insulating properties is used as the substrate. Examples of the porous sheet include a porous film, a woven fabric, and a nonwoven fabric. The material of the separator is not particularly limited, and may be a polymer material. Examples of the polymer material include a polyolefin resin, a polyamide resin, and cellulose. Examples of the polyolefin resin include polyethylene, polypropylene, and a copolymer of ethylene and propylene. The substrate may contain an additive as necessary. Examples of the additive include an inorganic filler. A sheet that is used as a separator in a lithium secondary battery may be used as the substrate.

(Spacer)

The spacer may contain a resin (e.g., an insulating resin), or contain a resin and particles. The spacer may be constituted of only a resin, or constituted of a resin and particles. The percentage of resin contained in the spacer may be 10 volume % or more, 30 volume % or more, or 50 volume % or more, and 100 volume % or less, or 80 volume % or less. The content percentage of particles contained in the spacer may be lower than a content percentage of particles contained in the heat-resistant layer.

Examples of the resin material include: fluorine-containing resin such as polyvinylidene fluoride (PVdF) and polytetrafluoroethylene; fluorine-containing rubber such as vinylidene fluoride-tetrafluoroethylene copolymer and ethylene-tetrafluoroethylene copolymer; rubbers such as styrene-butadiene copolymer and hydride thereof, acrylonitrile-butadiene copolymer and hydride thereof, methacrylic ester-acrylic ester copolymer, styrene-acrylic ester copolymer, acrylonitrile-acrylic ester copolymer, ethylene propylene rubber, polyvinyl alcohol, and polyvinyl acetate; cellulose derivatives such as ethyl cellulose, methyl cellulose, hydroxyethyl cellulose, and carboxymethyl cellulose; acrylic resin such as acrylic acid-methacrylic acid copolymer; polyphenylene ether; polysulfone; polyethersulfone; polyphenylene sulfide; polyether imide; polyimide; polyamide such as wholly-aromatic polyamide (aramid); polyamide imide; polyacrylonitrile; polyvinyl alcohol; polyether; polyacrylic acid; polymethacrylic acid; polyester; polyolefin; silicone resin; urethane resin; melamine resin; urea resin; and epoxy resin.

Out of the resin materials described above, polyimide, polyvinylidene fluoride, an acrylonitrile-acrylic ester copolymer, and the like are preferably used as materials that do not allow lithium ions to pass therethrough, and polyimide may be used. A non-porous spacer made of any of these resin materials and having a height larger than or equal to a certain height is a layer through which lithium ions do not pass. An average height of the spacer may be 3 times or more, 5 times or more, or 10 times or more of an average thickness of the heat-resistant layer, and 100 times or less, 30 times or less, or 20 times or less of the average thickness of the heat-resistant layer.

The particles may be inorganic particles or organic particles. In particular, the particles may be inorganic particles having insulating properties such as particles of a metal oxide, a metal hydroxide, a metal nitride, a metal carbide, or a metal sulfide. Examples of preferable metal oxides include aluminum oxide (alumina or boehmite), magnesium oxide, titanium oxide (titania), zirconium oxide, and silicon oxide (silica). Examples of the metal hydroxide include aluminum hydroxide. Examples of the metal nitride include silicon nitride, aluminum nitride, boron nitride, and titanium nitride. Examples of the metal carbide include silicon carbide and boron carbide. Examples of the metal sulfide include barium sulfide. It is also possible to use minerals such as aluminosilicate, layered silicate, barium titanate, and strontium titanate. In particular, it is preferable to use alumina, silica, titania, or the like.

An average particle diameter of the particles is not particularly limited, and may be 0.1 μm or more, or 0.5 μm or more, and 10 μm or less, 5 μm or less, or 2 μm or less. The average particle diameter can be measured using the following method. First, an image of a cross section of the spacer along the thickness direction of the separator is captured with use of an electron microscope. Next, portions corresponding to particles are identified in the image by performing image processing such as binarization on the image. Next, diameters (equivalent circle diameters) of circles having the same areas as cross-sectional areas of the particles are determined, and an arithmetic average of the determined equivalent circle diameters is taken as the average particle diameter. The arithmetic average can be obtained based on 100 or more particles, for example. Note that average particle diameters of other particles included in the electrode plates and the separator can be determined in the same manner.

When the spacer contains a resin material and particles, the content percentage of the particles in the spacer is preferably 50 volume % or less. In this case, the spacer is likely to have sufficiently high strength.

An average height Hs of the spacer is larger than a sum Tw of an average thickness Tb of the substrate and an average thickness Tt of the heat-resistant layer. A ratio Hs/Tw between the average height Hs and the sum Tw is more than 1, and may be 1.5 or more, 2 or more, or 3 or more. The ratio Hs/Tw may be 10 or less, 8 or less, 5 or less, or 4 or less. When the ratio is set to 1.5 or more, the expansion rate of the electrode group can be particularly reduced. Also, when the spacer is made high, the strength of the spacer increases, and accordingly, the effect of suppressing contraction of the substrate when the substrate is excessively heated increases. Consequently, an excessive increase in the temperature of the electrode group can be particularly suppressed.

The average height Hs can be measured using the following method. First, an image of a cross section of the separator along the thickness direction of the separator is captured with use of an electron microscope. Next, 20 points on the spacer are arbitrarily selected in the image, and the height of the spacer is measured at the selected points. Next, the arithmetic average of the heights measured at the 20 points is calculated, and the obtained average is taken as the average height Hs. The average thickness Tb and the average thickness Tt can be measured in the same manner.

The average thickness Tb of the substrate may be 5 μm or more, or 10 μm or more, and 30 μm or less, or 20 μm or less. The average thickness Tt of the heat-resistant layer may be 1 μm or more, or 2 μm or more, and 5 μm or less, or 3 μm or less. The average height Hs of the spacer may be 10 μm or more, or 20 μm or more, and 100 μm or less, 50 μm or less, 40 μm or less, or 30 μm or less. These height and thicknesses vary depending on the configurations of the positive electrode and the negative electrode, and may take values that are out of the ranges described above as examples. Note that the spacer is commonly formed so as to have a constant height as far as possible to make the distance between the electrode plates secured by the spacer constant as far as possible.

It is preferable that the spacer includes a non-porous structure through which lithium ions do not pass. Such a spacer can be realized by forming the spacer under conditions in which the spacer does not become porous. Note that, in the present specification, the description "lithium ions do not pass through" means that lithium ions do not pass through in an amount that will affect characteristics and the shape of the battery, and encompasses a case in which lithium ions move through the spacer but it can be considered that lithium ions do not substantially pass through the spacer.

An area S1 of the spacer may be 30% or less of an area S0 of the separator. When the area S1 is within this range, it is possible to secure sufficient spaces for deposition of lithium metal. Note that the area S1 and the area S0 are areas of the spacer and the separator when the separator is viewed from the spacer side. A ratio S1/S0 between the area S1 and the area S0 may be 0.20 or less (20% or less), or 0.10 or less, and 0.03 or more (3% or more), or 0.05 or more. By setting the ratio to 0.05 or more (5% or more), it is possible to increase the effect of suppressing an excessive increase in the temperature of the electrode group.

The spacer may include line-shaped protrusions and/or dot-shaped protrusions. From a point of view, line-shaped protrusions are ridge-shaped protrusions. In terms of increasing the effect of suppressing an excessive increase in the temperature of the electrode group, it is preferable that the spacer includes line-shaped protrusions, and may be constituted of only line-shaped protrusions.

When the spacer includes line-shaped protrusions, the width of the line-shaped protrusions may be 100 μm or more, or 200 μm or more, and 2000 μm or less, or 1000 μm or less.

The line-shaped protrusions may be mesh-shaped protrusions. By adopting mesh-shaped protrusions, it is possible to increase the effect of suppressing contraction of the substrate, and accordingly, it is possible to increase the effect of suppressing an excessive increase in the temperature of the electrode group. Alternatively, the spacer may include a plurality of line-shaped protrusions arranged in a stripe pattern.

The line-shaped protrusions may form a shape obtained by combining polygons in a plan view. Examples of a mesh shape include a shape obtained by combining polygons in such a manner that the polygons share their sides. Examples of the polygons include triangles, rectangles, and hexagons. It is also possible to combine different types of polygons. The line-shaped protrusions may form a honeycomb shape in a plan view. By adopting honeycomb-shaped protrusions, it is possible to increase the effect of suppressing an excessive increase in the temperature of the electrode group as described for mesh-shaped protrusions.

A preferable example of the spacer satisfies at least one of the following conditions (1) to (3), and preferably satisfies two or all of the conditions. When the following conditions are satisfied, it is possible to secure spaces in which lithium metal is deposited and to suppress an excessive increase in the temperature of the electrode group, in a well-balanced manner.

(1) The ratio S1/S0 between the area S1 and the area S0 is 0.30 or less. The ratio S1/S0 may be within any of the ranges described above.

(2) The spacer includes line-shaped protrusions, and the width of the line-shaped protrusions is 2000 μm or less. The width of the protrusions may be within any of the ranges described above.

(3) The spacer includes line-shaped protrusions, and the line-shaped protrusions are repeatedly formed in a regular pattern in a region between the positive electrode and the negative electrode. The pattern may be a mesh pattern (e.g., a honeycomb pattern).

It is preferable that a first resin constituting the spacer has a higher heat resistance than a second resin constituting the substrate. Here, having a higher heat resistance means that the decomposition temperature or melting point of the first resin is higher than the decomposition temperature or melting point of the second resin. Note that each of the first resin and the second resin may include a plurality of types of resins.

(Heat-Resistant Layer)

The heat-resistant layer may contain a polymer (hereinafter may be referred to as a "polymer (PL)") and inorganic particles. The inorganic particles may include first particles made of a phosphate containing lithium, and may further include second particles made of a material other than a phosphate. The heat-resistant layer is a layer that allows lithium ions to pass therethrough.

The phosphate constituting the first particles may be at least one selected from the group consisting of lithium phosphate ($Li_3PO_4$), dilithium hydrogen phosphate ($Li_2HPO_4$), and lithium dihydrogen phosphate ($LiH_2PO_4$). Among these, lithium phosphate is preferable because it has a high effect of suppressing heat generation from the battery in the event of an abnormality.

An average particle diameter of the first particles may be within a range from 0.1 μm to 1.0 μm (e.g., from 0.1 μm to 0.5 μm, from 0.1 μm to 0.2 μm, or from 0.1 μm to 0.19 μm). The average particle diameter of the first particles may be 0.1 μm or more, or 0.15 μm or more. The average particle diameter of the first particles may be 1.0 μm or less, 0.5 μm or less, 0.3 μm or less, or 0.2 μm or less. By setting the average particle diameter to 0.1 μm or more, it is possible to secure necessary and sufficient voids for allowing the electrolyte solution to permeate. From the viewpoint of forming a dense layer of the first particles, it is preferable to set the average particle diameter to 1.0 μm or less.

A polymer that has a higher heat resistance than a main component of the substrate of the separator can be used as the polymer (PL). It is preferable that the polymer (PL) includes at least one selected from the group consisting of aromatic polyamides, aromatic polyimides, and aromatic polyamide imides. These are known as polymers (from other viewpoints, macromolecules or resins) having high heat resistance. From the viewpoint of heat resistance, aramids, i.e., meta-aramids (meta-type wholly-aromatic polyamides) and para-aramids (para-type wholly-aromatic polyamides) are preferable. A preferable example of the polymer (PL) is a meta-aramid. It is possible to use, as the polymer (PL), a known aromatic polyamide, a known aromatic polyimide, and a known aromatic polyamide imide.

Examples of the aromatic polyamide (polymer (PL)) include a polymer that is formed through condensation polymerization of monomers having an aromatic skeleton and includes an amide bond in a repeating unit. Examples of the aromatic polyamide (e.g., wholly-aromatic polyamide) include meta-type aromatic polyamides (e.g., meta-type wholly-aromatic polyamides) and para-type aromatic polyamides (e.g., para-type wholly-aromatic polyamides). Wholly-aromatic polyamides are also called aramids.

A preferable example of the second particles (inorganic particles) are particles constituted by an inorganic compound that has insulating properties and does not melt and decompose when abnormal heat generation from the battery occurs. The second particles may be inorganic particles that are commonly used as an inorganic filler. Examples of the material of the second particles include an oxide, a hydrate of an oxide, a hydroxide, a nitride, a carbide, and a sulfide, and these may contain metal elements. An average particle diameter of the second particles may be 0.2 μm or more and 2 μm or less.

Examples of the oxide and the hydrate of an oxide include aluminum oxide, boehmite, magnesium oxide, titanium oxide, zirconium oxide, silicon oxide, yttrium oxide, and zinc oxide. Examples of the nitride include silicon nitride, aluminum nitride, boron nitride, and titanium nitride. Examples of the carbide include silicon carbide and boron carbide. Examples of the sulfide include barium sulfide. Examples of the hydroxide include aluminum hydroxide.

Alternatively, the material of the second particles may be a porous aluminosilicate such as zeolite, a layered silicate such as talc, barium titanate ($BaTiO_3$), strontium titanate ($SrTiO_3$), or the like. From the viewpoints of insulating properties, heat resistance, etc., it is possible to use, as the material of the second particles, at least one selected from the group consisting of aluminum oxide, boehmite, talc, titanium oxide, and magnesium oxide.

The average particle diameter of the second particles may be within any of the ranges described as examples for the average particle diameter of the first particles.

The inorganic particles may include the above-described first particles and the second particles made of a material other than a phosphate. In this case, the heat-resistant layer may include a first layer containing the first particles and a second layer containing the second particles. With this configuration, the effect of suppressing an excessive increase in the temperature of the electrode group can be particularly increased. Note that the heat-resistant layer may be constituted of only the first layer or only the second layer.

The first layer and the second layer may be provided on the positive electrode side main surface of the two main surfaces of the substrate, or on the negative electrode side main surface, or may be respectively provided on different main surfaces. For example, the separator may have a layered structure constituted of the substrate/the first layer/the second layer/the spacer, the substrate/the second layer/the first layer/the spacer, the first layer/the second layer/the substrate/the spacer, or the second layer/the first layer/the substrate/the spacer. Alternatively, the first layer and the second layer may be respectively provided on different main surfaces of the substrate. For example, the separator may have a layered structure constituted of the first layer/the substrate/the second layer/the spacer or the second layer/the substrate/the first layer/the spacer. The separator is disposed in such a manner that the spacer faces the positive electrode. That is, the spacer is disposed on the positive electrode side with respect to the substrate and the heat-resistant layer.

The first layer may contain the first particles as a main component. The content percentage of the first particles in the first layer may be within a range from 50 mass % to 99 mass %, a range from 85 mass % to 99 mass %, or a range from 90 mass % to 98 mass %. The content percentage may be 50 mass % or more, 70 mass % or more, 85 mass % or more, or 90 mass % or more. The content percentage may be 99 mass % or less, 98 mass % or less, or 95 mass % or less. When the content percentage is within any of these ranges, the first particles have a sufficient surface area, and it is easy to inactivate lithium when the temperature is high.

The first layer may contain a solid component other than the first particles. For example, the first layer may contain a binder, an inorganic component (e.g., inorganic particles) other than the first particles, the polymer (PL), or the like.

When the first layer contains a binder, the content percentage of the binder in the first layer may be within a range from 1 mass % to 15 mass %, or a range from 2 mass % to 10 mass %. The content percentage of the binder in the first layer may be 1 mass % or more, or 2 mass % or more. The content percentage of the binder in the first layer may be 15 mass % or less, or 10 mass % or less.

There is no particular limitation on the binder contained in the first layer, and examples of the binder include a polyolefin (e.g., polyethylene, polypropylene, or a copolymer of ethylene and α-olefin), a fluorine-containing resin (e.g., polyvinylidene fluoride, polytetrafluoroethylene, or polyvinyl fluoride), fluorine-containing rubber (e.g., a vinylidene fluoride-hexafluoropropylene-tetrafluoroethylene copolymer or an ethylene-tetrafluoroethylene copolymer), a styrene-butadiene copolymer and a hydride thereof, an acrylonitrile-butadiene copolymer and a hydride thereof, an acrylonitrile-butadiene-styrene copolymer and a hydride thereof, and N-vinyl acetamide.

(Second Layer)

The second layer contains the second particles other than the first particles (particles of a phosphate) as described above. Note that the second layer may contain the first particles, but does not necessarily need to contain the first particles.

It is preferable that the second layer contains the polymer (PL). The content percentage of the polymer (PL) in the second layer may be within a range from 50 mass % to 100 mass % (e.g., from 80 mass % to 100 mass %, or from 90 mass % to 100 mass %). The second layer may be constituted of only the polymer (PL).

The second layer may contain the second particles as a main component. The content percentage of the second particles in the second layer may be within a range from 50 mass % to 99 mass % (e.g., from 85 mass % to 99 mass %). In this case, the second layer may also contain a binder. Any of the examples of binder described for the first layer may be used as the binder. The content percentage of the second particles in the second layer may be 50 mass % or more, 70 mass % or more, 85 mass % or more, or 90 mass % or more. The content percentage may be 99 mass % or less, 98 mass % or less, or 95 mass % or less.

Thicknesses of the first layer and the second layer may be independently set so as to fall within a range from 0.2 μm to 10 μm (e.g., from 1 μm to 8 μm, from 2 μm to 4 μm, or from 4 μm to 10 μm). For example, the thickness of the first layer may be within a range from 0.2 μm to 10 μm, and the thickness of the second layer may be within a range from 0.2 μm to 10 μm. The thickness of the first layer may be 0.2 μm or more, 0.3 μm or more, or 0.5 μm or more, and is preferably 1 μm or more, more preferably 2 μm or more, further preferably 3 μm or more, and yet more preferably 4 μm or more. The thickness of the first layer may be 10 μm or less, 8 μm or less, 7 μm or less, or 5 μm or less. The thickness of the second layer may be 0.2 μm or more, 0.3 μm or more, or 0.5 μm or more, and is preferably 1 μm or more, more preferably 2 μm or more, further preferably 3 μm or more, and yet more preferably 4 μm or more. The thickness of the second layer may be 10 μm or less, 8 μm or less, 7 μm or less, or 5 μm or less. A configuration in which at least one of the first layer and the second layer has a thickness of 0.2 μm or more is advantageous in terms of suppressing an increase in the temperature of the battery in the event of an abnormality. From the viewpoint of electrical characteristics of the battery, a configuration in which at least one of the first layer and the second layer has a thickness of 10 μm or less is advantageous.

When the heat-resistant layer contains the first particles, an increase in the temperature of the battery in the event of an abnormality can be particularly suppressed. At present, it is unclear by what mechanism such an increase can be suppressed with this configuration. One possibility is that, when the temperature of the battery has increased abnormally, the first particles react with lithium metal on the negative electrode and reactivity of the surface of the lithium metal decreases.

A preferable example of the separator may satisfy the following condition (K1), and may further satisfy the following condition (K2) and/or the following condition (K3). When the following conditions are satisfied, an excessive increase in the temperature of the electrode group can be particularly suppressed.

(K1) The spacer contains at least one resin selected from the group consisting of polyvinylidene fluoride, an acrylonitrile-acrylic ester copolymer, and polyimide.

(K2) The heat-resistant layer contains at least one resin selected from the group consisting of wholly-aromatic polyamide, polyvinylidene fluoride, and N-vinyl acetamide. In this case, it is preferable that the heat-resistant layer contains particles made of a phosphate.

(K3) The substrate contains a polyolefin (polyethylene, polypropylene, etc.) as a main component (content percentage: 50 mass % or more).

(Method for Forming Separator)

There is no particular limitation on the method for forming the separator, and the separator may be formed using the following method. First, a substrate is prepared. A commercially-available substrate may be used. Next, a heat-resistant layer is formed on the substrate.

There is no particular limitation on the method for forming the heat-resistant layer, and the heat-resistant layer may be formed using the following method. First, components of the heat-resistant layer are mixed with a liquid component (dispersion medium) to form a slurry (or a coating liquid). Next, the slurry (or the coating liquid) is applied to the substrate to form a coating film, and then the coating film is dried. Thus, the heat-resistant layer can be formed. There is no particular limitation on the liquid component used to form the slurry (or the coating liquid). Examples of the liquid component include N-methyl-2-pyrrolidone. When the heat-resistant layer includes a first layer and a second layer, each of the first layer and the second layer can be formed using the above-described method.

There is no particular limitation on each step included in the formation of the heat-resistant layer, and known methods can be applied. For example, the slurry (or the coating liquid) may be applied using a known method such as a method in which a bar coater is used. Also, drying may be performed using a known method such as heating or natural drying.

The spacer is formed on the heat-resistant layer or on the substrate. There is no particular limitation on the method for forming the spacer, and the spacer may be formed using the following method. First, components of the spacer and a liquid component are mixed to prepare a slurry or a coating liquid. Next, the slurry or the coating liquid is applied to portions in which the spacer is to be formed, and then the slurry or the coating liquid is dried. Thus, the spacer can be formed. Examples of the liquid component include N-methyl-2-pyrrolidone. The slurry or the coating liquid may be applied with use of a dispenser or the like, or a known printing method such as gravure printing, ink jet printing, or screen printing. Also, drying may be performed using a known method such as heating or natural drying. The separator is obtained as described above.

The following specifically describes examples of components of the lithium secondary battery (L). Note that the components described below are examples, and components of the lithium secondary battery (L) according to the present embodiment are not limited to the following components. Known components may be used as components other than components that are characteristic to the present embodiment. The separator has been described above, and a redundant description thereof is omitted.

[Negative Electrode]

The negative electrode includes a negative electrode current collector. In the lithium secondary battery (L), lithium metal is deposited on the negative electrode current collector during charging. More specifically, lithium ions contained in the non-aqueous electrolyte receive electrons on the negative electrode current collector during charging and become lithium metal, which is deposited on the negative electrode current collector. The lithium metal deposited on the negative electrode current collector dissolves as lithium ions in the non-aqueous electrolyte during discharging. The lithium ions contained in the non-aqueous electrolyte may be either derived from a lithium salt added to the non-aqueous electrolyte or supplied from a positive electrode active material during charging, or both.

An electrically conductive sheet can be used as the negative electrode current collector. When the electrode group is a wound electrode group, a belt-shaped conductive sheet is used. Examples of the conductive sheet include a conductive film and a metal foil.

The conductive sheet may have a smooth surface. In this case, lithium metal derived from the positive electrode tends to be uniformly deposited on the conductive sheet during charging. The smooth surface means that the conductive sheet has a maximum height roughness Rz of 20 μm or less. The conductive sheet may have a maximum height roughness Rz of 10 μm or less. The maximum height roughness Rz is measured in accordance with JIS (Japanese Industrial Standard) B 0601:2013.

The negative electrode current collector (conductive sheet) may be made of an electrically conductive material other than lithium metal and lithium alloys. The conductive material may be a metal material such as a metal or an alloy. The conductive material preferably causes no reaction with lithium. Specifically, a material that forms neither an alloy nor an intermetallic compound with lithium is preferred. Examples of such a conductive material include copper (Cu), nickel (Ni), iron (Fe), an alloy of one or more of these metal elements, and graphite having a basal plane predominately exposed on its surface. Examples of the alloy include a copper alloy and stainless steel (SUS). Among these, copper and/or a copper alloy is preferred because of its high electrical conductivity. The thickness of the negative electrode current collector is not particularly limited, and may be within a range from 5 to 300 μm.

The negative electrode current collector may have a negative electrode mixture layer on its surface. The negative electrode mixture layer is formed by, for example, applying a paste including a negative electrode active material, such as graphite, to at least a part of the surface of the negative electrode current collector. In view of achieving a lithium secondary battery superior in capacity to lithium ion batteries, however, the negative electrode mixture layer is formed sufficiently thin so that lithium metal can be deposited on the negative electrode.

The negative electrode may include the negative electrode current collector and sheet-shaped lithium metal or a lithium alloy on the negative electrode current collector. That is, it is also possible to provide the negative electrode current collector with a primer layer (a layer of lithium metal or a lithium alloy) containing lithium metal in advance. The lithium alloy may contain elements such as aluminum, magnesium, indium, or zinc in addition to lithium. By providing the primer layer in advance and causing lithium metal to be deposited on the primer layer during charging, it is possible to more effectively suppress dendritic deposition of lithium metal. The thickness of the primer layer is not particularly limited, and may be within a range from 5 μm to 25 μm, for example.

[Positive Electrode]

The positive electrode includes, for example, a positive electrode current collector and a positive electrode mixture layer supported on the positive electrode current collector. The positive electrode mixture layer contains a positive electrode active material, an electrically conductive material, and a binder, for example. The positive electrode mixture layer may be formed on one surface or both surfaces of the positive electrode current collector. The positive electrode can be obtained by, for example, applying a positive electrode mixture slurry including the positive electrode active material, the electrically conductive material, and the binder to both surfaces of the positive electrode current collector, followed by drying and then rolling the dry applied film.

The positive electrode active material absorbs and releases lithium ions. Examples of the positive electrode active material include a lithium-containing transition metal oxide, a transition metal fluoride, a polyanion, a fluorinated polyanion, and a transition metal sulfide. Preferred among them is a lithium-containing transition metal oxide in terms of its low production cost and high average discharge voltage.

Examples of a transition metal element contained in the lithium-containing transition metal oxide include Sc, Ti, V, Cr, Mn, Fe, Co, Ni, Cu, Y, Zr, and W. The lithium-containing transition metal oxide may contain one transition metal element or two or more transition metal elements. The transition metal element may be Co, Ni, and/or Mn. The lithium-containing transition metal oxide can contain one or more typical elements, as needed. Examples of the typical element include Mg, Al, Ca, Zn, Ga, Ge, Sn, Sb, Pb, and Bi. The typical element may be Al, for example.

The lithium-containing transition metal oxide is preferably a composite oxide that contains Co, Ni, and/or Mn as a transition metal element(s) and Al as an optional component and has a crystal structure like that of rock-salt having a layered structure, in view of achieving a high capacity. In this case, in the lithium secondary battery, a molar ratio mLi/mM of a total amount mLi of lithium present in the positive and negative electrodes to an amount mM of metal M other than lithium present in the positive electrode may be set to 1.1 or less, for example.

The conductive material is a carbon material, for example. Examples of the carbon material include carbon black, acetylene black, Ketjen Black, carbon nanotube, and graphite.

Examples of the binder include a fluorocarbon resin, polyacrylonitrile, a polyimide resin, an acrylic resin, a polyolefin resin, and a rubbery polymer. Examples of the fluorocarbon resin include polytetrafluoroethylene and polyvinylidene fluoride.

It is sufficient that the positive electrode current collector is an electrically conductive sheet. The conductive sheet may be a foil, film, or the like. The positive electrode current collector may be coated with a carbon material.

The positive electrode current collector (conductive sheet) may be made of a metal material including Al, Ti, Fe, or the like, for example. The metal material may be Al, an Al alloy, Ti, a Ti alloy, a Fe alloy, or the like. The Fe alloy may be stainless steel (SUS). The thickness of the positive electrode current collector is not particularly limited, and may be within a range from 5 to 300 μm.

[Non-Aqueous Electrolyte]

The non-aqueous electrolyte having lithium ion conductivity includes, for example, a non-aqueous solvent, and lithium ions and anions dissolved in the non-aqueous solvent. The non-aqueous electrolyte may be a liquid or a gel.

A liquid non-aqueous electrolyte is prepared by dissolving a lithium salt in a non-aqueous solvent. When the lithium salt is dissolved in the non-aqueous solvent, lithium ions and anions are produced.

A gel non-aqueous electrolyte includes a lithium salt and a matrix polymer, or includes a lithium salt, a non-aqueous solvent, and a matrix polymer. The matrix polymer is a polymer material that forms a gel by absorbing the non-aqueous solvent, for example. Examples of the polymer material include a fluorocarbon resin, an acrylic resin, and a polyether resin.

The lithium salt or anions may be any known lithium salt or anions that are used for non-aqueous electrolytes for lithium secondary batteries. Specific examples thereof include $BF_4^-$, $ClO_4^-$, $PF_6^-$, $CF_3SO_3^-$, $CF_3CO_2^-$, imide anions, and oxalate complex anions. Examples of the imide anions include $N(SO_2CF_3)_2^-$ and $N(C_mF_{2m+1}SO_2)_x(C_nF_{2n+1}SO_2)_y^-$, where m and n are independently 0 or an integer of 1 or more, x and y are independently 0, 1, or 2, and x+y=2. The oxalate complex anions may contain boron and/or phosphorus. Examples of the oxalate complex anions include bis(oxalato) borate anions, $BF_2(C_2O_4)^-$, $PF_4$ $(C_2O_4)^-$, and $PF_2(C_2O_4)_2^-$. The non-aqueous electrolyte may include one of these anions, or two or more of them.

From the viewpoint of suppressing dendritic deposition of lithium metal, the non-aqueous electrolyte preferably includes at least oxalate complex anions. The oxalate complex anions interact with lithium to make lithium metal more likely to be deposited uniformly in a fine particulate state. Therefore, local deposition of lithium metal is unlikely to occur. The oxalate complex anions may be used in combination with other anions. The other anions may be $PF_6^-$ and/or imide anions.

The non-aqueous electrolyte may include $LiBF_2(C_2O_4)$ (lithium difluoro (oxalato) borate) as a solute (lithium salt).

Examples of the non-aqueous solvent include an ester, an ether, a nitrile, an amide, and halogen substituted derivatives of these. The non-aqueous electrolyte may include one of these non-aqueous solvents, or two or more of them. Examples of the halogen substituted derivatives include fluorides.

Examples of the ester include a carbonic ester and a carboxylic acid ester. Examples of a cyclic carbonic ester include ethylene carbonate, propylene carbonate, and fluoroethylene carbonate (FEC). Examples of a chain carbonic ester include dimethyl carbonate (DMC), ethyl methyl carbonate (EMC), and diethyl carbonate. Examples of a cyclic carboxylic acid ester include γ-butyrolactone and γ-valerolactone. Examples of a chain carboxylic acid ester include ethyl acetate, methyl propionate, and methyl fluoropropionate.

Examples of the ether include a cyclic ether and a chain ether. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The lithium salt concentration in the non-aqueous electrolyte is 0.5 mol/L or more and 3.5 mol/L or less, for example. The anion concentration in the non-aqueous electrolyte may be set to 0.5 mol/L or more and 3.5 mol/L or less. The oxalate complex anion concentration in the non-aqueous electrolyte may be set to 0.05 mol/L or more and 1 mol/L or less.

The non-aqueous electrolyte may contain an additive. The additive may form a surface film on the negative electrode. When the surface film derived from the additive is formed on the negative electrode, the dendrite formation and growth tend to be suppressed. Examples of the additive include vinylene carbonate, FEC, and vinyl ethyl carbonate (VEC).

The following specifically describes an example of the lithium secondary battery (L) according to the present embodiment with reference to the drawings. The above-described components can be applied to components of the following example of the lithium secondary battery. Also, the components of the following example can be changed based on the above description. Also, matters described below may be applied to the embodiment described above. In the lithium secondary battery described below, components that are not essential for the lithium secondary battery according to the present disclosure may be omitted. In the drawings referred to below, the scale of the components is changed to facilitate understanding.

Embodiment 1

FIG. 1 is a schematic longitudinal cross-sectional view showing an example of a lithium secondary battery according to Embodiment 1. A cylindrical lithium secondary battery 10 shown in FIG. 1 includes a cylindrical battery case, and a wound electrode group 14 and a non-aqueous electrolyte (not shown) housed in the battery case. The battery case includes a case body 15, which is a bottomed cylindrical metal container, and a sealing body 16 sealing an opening of the case body 15. A gasket 27 is placed between the case body 15 and the sealing body 16. The hermeticity of the battery case is secured by the gasket 27. Within the case body 15, electrically insulating plates 17 and 18 are placed respectively at two ends of the electrode group 14 in a winding axis direction.

The case body 15 has a step portion 21 formed by partially pressing a sidewall of the case body 15 from outside, for example. The step portion 21 may be formed as an annular step portion extending along the circumferential direction of the case body 15 in the sidewall of the case body 15. In this case, the sealing body 16 is supported on the opening-side surface of the step portion 21.

The sealing body 16 includes a filter 22, a lower valve body 23, an electrically insulating member 24, an upper valve body 25, and a cap 26. These members are layered in this order in the sealing body 16. The sealing body 16 is attached to the opening of the case body 15 in such a manner that the cap 26 is located outside the case body 15 and the filter 22 is located inside the case body 15. The above-described members constituting the sealing body 16 each have a circular plate shape or a ring shape, for example. Central portions of the lower valve body 23 and the upper valve body 25 are connected to each other, and the insulating member 24 is interposed between peripheral portions of the lower valve body 23 and the upper valve body 25. Central portions of the filter 22 and the lower valve body 23 are connected to each other. Central portions of the upper valve body 25 and the cap 26 are connected to each other. That is, the members other than the insulating member 24 are electrically connected to each other.

The lower valve body 23 includes an air vent hole (not shown). Accordingly, when the internal pressure of the battery case rises due to abnormal heat generation or other events, the upper valve body 25 bulges toward the cap 26 and is spaced away from the lower valve body 23. Thus, the electrical connection between the lower valve body 23 and the upper valve body 25 is cut off. When the internal pressure further rises, the upper valve body 25 ruptures to let gas escape through an opening (not shown) provided in the cap 26.

Figure 2:
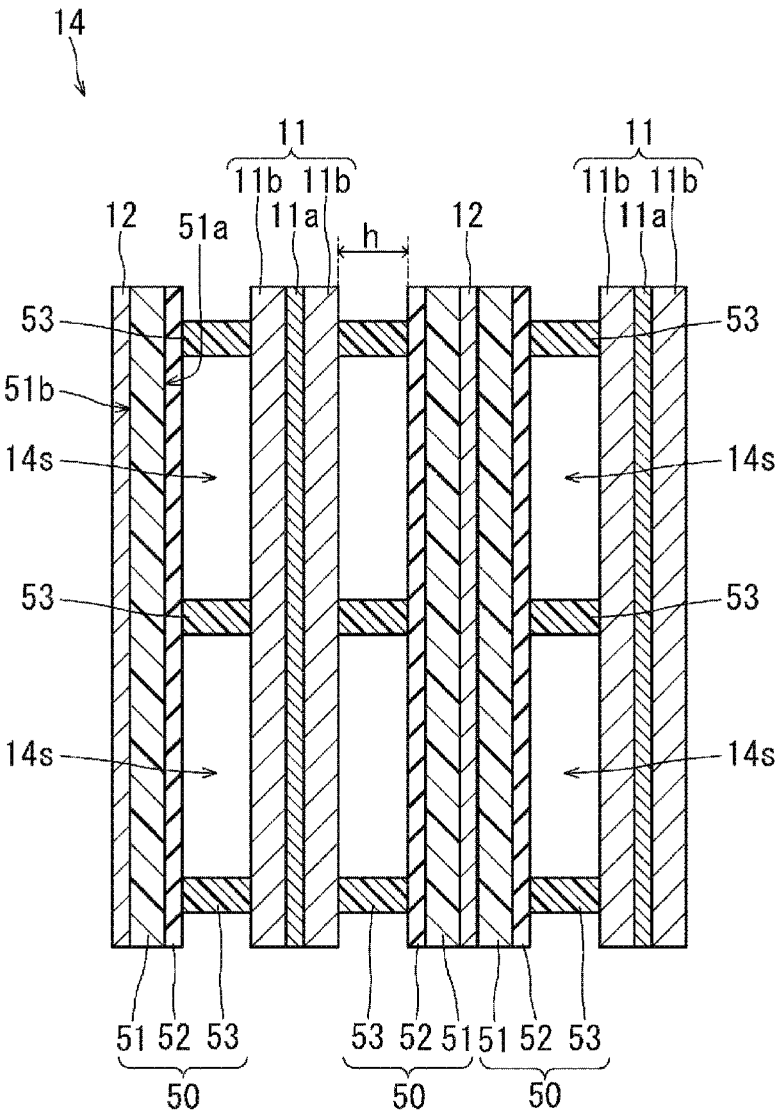
FIG. 2 A schematic cross-sectional view showing a part of the lithium secondary battery shown in FIG. 1.

FIG. 2 is an enlarged view of a portion of the electrode group 14. FIG. 2 includes a portion near a positive electrode, which corresponds to a region II shown in FIG. 1, and a portion near a negative electrode, which corresponds to a region III shown in FIG. 1.

The electrode group 14 includes a positive electrode 11, a negative electrode 12, and a separator 50. The positive electrode 11, the negative electrode 12, and the separator 50 each have a belt-like shape. The belt-shaped positive electrode 11 and the belt-shaped negative electrode 12 are wound spirally together with the separator 50 interposed therebetween, such that the width direction of each of the positive electrode 11 and the negative electrode 12 is parallel with the winding axis. In a cross section of the electrode group 14 perpendicular to the winding axis, the positive electrode 11 and the negative electrode 12 are alternately layered in a radial direction of the electrode group 14, with the separator 50 interposed between the positive electrode 11 and the negative electrode 12. That is, the longitudinal direction of each electrode is a winding direction, and the width direction of each electrode is an axial direction.

The positive electrode 11 includes a positive electrode current collector 11*a* and positive electrode mixture layers 11*b*. The positive electrode current collector 11*a* is electrically connected to the cap 26, which serves as a positive electrode terminal, via a positive electrode lead 19. FIG. 2 shows a negative electrode (negative electrode current collector) in a state where lithium metal has not been deposited thereon, as the negative electrode 12. The negative electrode 12 is electrically connected to the case body 15, which serves as a negative electrode terminal, via a negative electrode lead 20.

As shown in FIG. 2, the separator 50 includes a substrate 51, a heat-resistant layer 52, and a spacer 53. In Embodiment 1, the heat-resistant layer 52 is formed on a main surface 51*a* of the substrate 51, which is the positive electrode 11 side main surface out of two main surfaces 51*a* and 51*b* of the substrate 51. It is preferable that the heat-resistant layer 52 is formed on at least one main surface of the substrate 51 so as to cover at least a region sandwiched between the positive electrode 11 and the negative electrode 12. The heat-resistant layer 52 may be formed so as to cover an entire region of one main surface of the substrate 51, or entire regions of both main surfaces of the substrate 51.

The spacer 53 is formed on the heat-resistant layer 52. In the electrode group 14, the spacer 53 is in contact with the positive electrode 11. Spaces 14*s* are formed on the surface of the positive electrode 11 (between the heat-resistant layer 52 and the positive electrode 11) by the spacer 53. On the other hand, the substrate 51 is present on the surface of the negative electrode 12. The height of the spacer 53 is indicated by h in FIG. 2.

In the lithium secondary battery 10, lithium metal is deposited on the negative electrode 12 during charging. The lithium metal deposited on the negative electrode 12 presses portions of the separator 50 (the substrate 51 and the heat-resistant layer 52) in which the spacer 53 is not provided, toward the positive electrode 11. Consequently, the lithium metal is deposited in the spaces 14*s*. The deposited lithium metal dissolves in the non-aqueous electrolyte during discharging. Since the lithium metal deposited on the surface of the negative electrode 12 is stored in the spaces 14*s*, changes in the volume of the electrode group 14 associated with the deposition of lithium metal are suppressed, and cycle characteristics are improved.

If the spacer 53 allows lithium ions to pass therethrough, lithium ions pass through the spacer 53 during charging. Lithium ions that have passed through the spacer 53 are deposited between the substrate 51 and the negative electrode 12 in portions in which the spacer 53 is provided. Consequently, the thickness of the electrode group 14 in a layered direction increases. Therefore, it is preferable that the spacer 53 does not allow lithium ions to pass therethrough. In the case of the wound electrode group, the layered direction is the radial direction of the wound electrode group.

Figure 3:
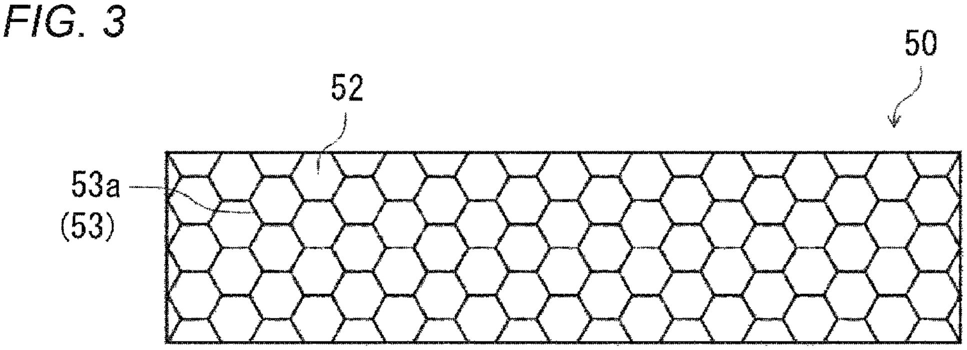
FIG. 3 A top view showing an example of a pattern of a spacer.
Figure 4:
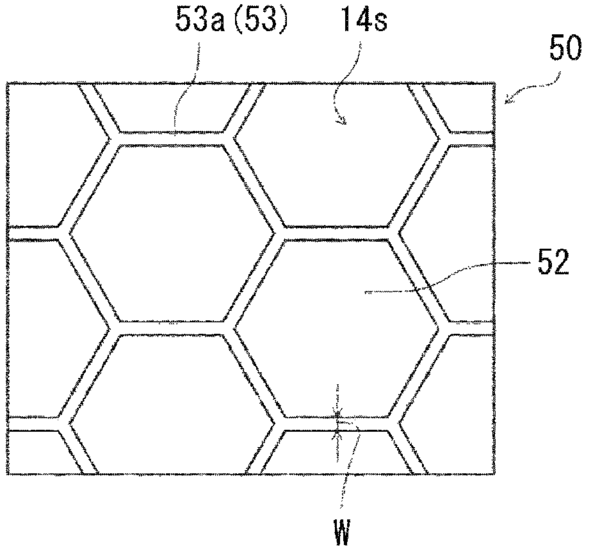
FIG. 4 An enlarged view of a portion shown in FIG. 3.

FIG. 3 shows an example of the shape of the spacer 53 in a plan view, and FIG. 4 is an enlarged view of a portion shown in FIG. 3. In the example shown in FIG. 3, the spacer 53 is constituted by line-shaped protrusions 53*a*. The line-shaped protrusions 53*a* are arranged in a mesh pattern. More specifically, the line-shaped protrusions 53*a* are uniformly formed in a honeycomb pattern. The honeycomb pattern is a pattern obtained by arranging a plurality of hexagons in such a manner that the hexagons share their sides. Regions in which the line-shaped protrusions 53*a* are not formed constitute the spaces 14*s*. The width of line-shaped protrusions 53*a* is indicated by W in FIG. 4.

Figure 5:
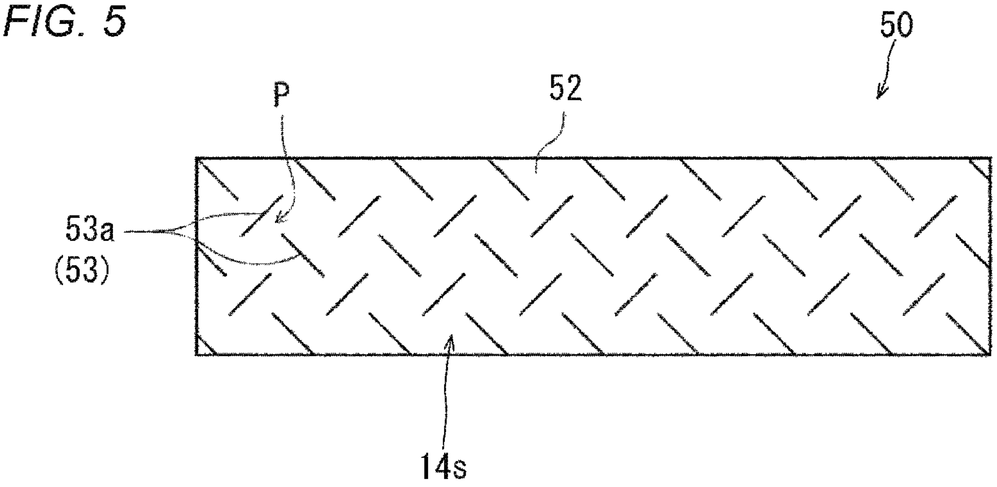
FIG. 5 A top view showing another example of the pattern of the spacer.

FIG. 5 shows another example of the shape of the spacer 53 in a plan view. The spacer 53 shown in FIG. 5 includes a plurality of line-shaped protrusions 53*a* that are spaced apart from each other. There are gaps P between the line-shaped protrusions 53*a*. Regions in which the line-shaped protrusions 53*a* are not formed constitute the spaces 14*s*.

In Embodiment 1, a cylindrical lithium secondary battery including a wound electrode group has been described. However, the lithium secondary battery according to the present embodiment is not limited to the form described in Embodiment 1, and can also be applied to other forms. The shape of the lithium secondary battery can be selected according to its use and the like from various shapes such as cylindrical, coin, square, sheet, and flat shapes. The electrode group also may be in any form, and may be in the form of a stack.

EXAMPLES

The lithium secondary battery according to the present embodiment will be described specifically with reference to Examples and Comparative Examples. However, the present disclosure is not limited to the following Examples.

(Battery A1)

A lithium secondary battery A1 was produced as described below.

(1) Production of Positive Electrode

A lithium-containing transition metal oxide (NCA: positive electrode active material) containing Li, Ni, Co, and Al (the molar ratio of Li to the total of Ni, Co, and Al was 1.0) and having a layered rock-salt structure was prepared. A positive electrode mixture slurry was prepared by mixing the lithium-containing transition metal oxide (NCA), acetylene black (AB; conductive material), and polyvinylidene fluoride (PVdF; binder) at a mass ratio of NCA:AB:PVdF=95:2.5:2.5, adding an appropriate amount of N-methyl-2-pyrrolidone (NMP) to the mixture, and stirring the mixture. Next, the obtained positive electrode mixture slurry was applied to both surfaces of a belt-shaped Al foil (positive electrode current collector), and then dried to form coating films of the positive electrode mixture. Next, the coating films were rolled with use of rollers. Lastly, the resultant stack of the positive electrode current collector and the positive electrode mixture was cut in a predetermined electrode size, and thus a positive electrode including positive electrode mixture layers on both surfaces of the positive electrode current collector was produced.

(2) Preparation of Negative Electrode

A belt-shaped copper foil (thickness: 12 μm) provided with rolled layers of lithium metal (thickness: 25 μm) on both surfaces thereof was used as a negative electrode.

(3) Production of Separator

First, a belt-shaped porous polyethylene film (average thickness: 10 μm) was prepared as a substrate. Next, a heat-resistant layer (average thickness: 2 μm) was formed on a surface of the substrate. The heat-resistant layer was formed by forming a second layer and a first layer in this order on the substrate.

The second layer was formed as described below. First, N-methyl-2-pyrrolidone (NMP) and calcium chloride were mixed at a mass ratio of 94.2:5.8. The mixture was heated to about 80° C. to completely dissolve calcium chloride. Then, the solution was cooled to room temperature, 2200 g of the solution was collected, and 0.6 mol of p-phenylenediamine (PPD) was added thereto and completely dissolved. In a state where the solution was kept at about 20° C., 0.6 mol of terephthalic acid dichloride (TPC) was added thereto little by little. The obtained solution was aged at about 20° C. for 1 hour to obtain a polymerization solution. Next, 100 g of the polymerization solution was mixed with an N-methyl-2-pyrrolidone solution in which 5.8 mass % of calcium chloride had been dissolved to obtain a solution (coating liquid) containing p-phenylene terephthalamide (PPTA), which is an aromatic polyamide (aramid), at a concentration of 2 mass %.

Next, the coating liquid was applied to the substrate using a slot-die method to form a coating film. Next, the substrate provided with the coating film was left to stand in an atmosphere having a relative humidity of 70% at a temperature of 25° C. for 1 hour to cause deposition of the aromatic polyamide. Next, NMP and calcium chloride contained in the coating film were removed by washing the substrate with water. Next, the coating film was dried at 60° C. for 5 minutes, and thus the second layer was formed.

The first layer was formed as described below. First, particles of lithium phosphate ($Li_3PO_4$) and poly(N-vinylacetamide) (PNVA) were mixed at a mass ratio of 100:8 to obtain a mixture. The particles of lithium phosphate used had a volume-based median diameter of 0.19 μm. Water (ion exchanged water) was added to the obtained mixture, and the mixture was stirred to obtain a slurry (coating liquid) having a solid content concentration of 12 mass %. Next, the slurry was applied to the second layer using a micro gravure coating method to form a coating film. Next, the coating film was dried in a drying furnace provided beside the coating machine. Thus, the first layer was formed. Thus, the heat-resistant layer was formed.

Next, a coating liquid containing polyvinylidene fluoride and alumina particles (inorganic filler) was ejected toward the heat-resistant layer with use of a dispenser to form the pattern shown in FIG. 3. Thereafter, the coating liquid was dried in a vacuum. Thus, a non-porous spacer having a honeycomb shape shown in FIG. 3 was formed.

Meshes formed by the spacer were regular hexagons. The height of line-shaped protrusions was set to 30 μm (average height: 30 μm). The distance between two sides facing each other out of the sides constituting each regular hexagonal mesh was set to about 2.25 mm. The width of the line-shaped protrusions was set to 0.25 mm. The area S1 of the spacer was 21% of the area S0 of the separator.

(4) Preparation of Non-Aqueous Electrolyte

Ethylene carbonate (EC) and dimethyl carbonate (DMC) were mixed at a volume ratio of EC:DMC=30:70. $LiPF_6$ and $LiBF_2(C_2O_4)$ were dissolved in the obtained solvent mixture at concentrations of 1 mol/L and 0.1 mol/L, respectively, to prepare a liquid non-aqueous electrolyte.

(5) Production of Battery

An Al tab was attached to the positive electrode obtained as described above. An Ni tab was attached to the negative electrode described above. The positive electrode and the negative electrode were spirally wound in an inert gas atmosphere with the separator interposed therebetween to form a wound electrode group. At this time, the separator was disposed in such a manner that the spacer faced the positive electrode. The obtained electrode group was housed in a pouch-like outer case formed of a laminate sheet including an Al layer, the above-described non-aqueous electrolyte was then poured into the outer case, and thereafter, the outer case was sealed. Thus, the lithium secondary battery A1 was produced.

(Battery A2)

A battery A2 was produced under the same conditions using the same method as those used to produce the battery A1, except that the pattern of the spacer was changed. A spacer formed into a stripe pattern, rather than a honeycomb pattern, was used in the battery A2. The height and width of the line-shaped protrusions and the ratio S1/S0 between the area S1 and the area S0 were the same as those in the separator included in the battery A1.

(Battery C1)

A battery C1 was produced under the same conditions using the same method as those used to produce the battery A1, except that the positive electrode and the separator were changed.

A separator used in the battery C1 was the same as the separator included in the battery A1, except that the separator used in the battery C1 did not include the spacer. That is, the separator used in the battery C1 was constituted of the substrate and the heat-resistant layer.

A positive electrode used in the battery C1 was obtained by forming spacers on both surfaces of the positive electrode used in the battery A1. The spacers were formed into the same pattern as the pattern of the spacer included in the separator of the battery A1 by using the same method as that used to form the spacer included in the separator of the battery A1. The battery C1 was produced with use of this positive electrode and the separator described above.

(Battery C2)

A battery C2 was produced under the same conditions using the same method as those used to produce the battery A1, except that the separator was changed.

A separator used in the battery C2 was the same as the separator included in the battery A1, except that the separator used in the battery C2 did not include the heat-resistant layer. That is, in the production of the separator used in the battery C2, the spacer was formed on the substrate. The spacer was formed into the same pattern as the pattern of the spacer included in the separator of the battery A1 by using the same method as that used to form the spacer included in the separator of the battery A1. The battery C2 was produced with use of this separator.

(Battery C3)

A battery C3 was produced under the same conditions using the same method as those used to produce the battery A1, except that the separator was changed.

A separator used in the battery C3 was the same as the separator included in the battery A1, except that the height of the spacer was changed. The height of the separator used in the battery C3 was set to 10 μm (average height: 10 μm). The spacer was formed into the same pattern as the pattern of the spacer included in the separator of the battery A1 by using the same method as that used to form the spacer included in the separator of the battery A1. The battery C3 was produced with use of this separator. Note that the separator was disposed in such a manner that the spacer faced the positive electrode.

(Battery C4)

A battery C4 was produced under the same conditions using the same method as those used to produce the battery A1, except that the separator was changed.

A separator used in the battery C4 was the same as the separator included in the battery A1, except that the spacer was not formed. The battery C4 was produced with use of this separator. Note that the separator was disposed in such a manner that the heat-resistant layer faced the positive electrode.

The plurality of batteries produced as described above were evaluated using the following methods.

(Charge-discharge test)

A charge-discharge test was performed on the obtained batteries. In the charge-discharge test, each battery was charged under conditions described below, and after left to stand for 20 minutes, discharged under conditions described below, in a constant-temperature bath at 25° C.

(Charging)

Constant-current charging was performed until the battery voltage reached 4.1 V at a current of 2.15 mA per unit area (square centimeters) of the electrodes, and then constant-voltage charging was performed at the voltage of 4.1 V until the current value per unit area of the electrodes reached 0.54 mA.

(Discharging)

Constant-current discharging was performed at a current of 2.15 mA per unit area of the electrodes until the battery voltage reached 3.75 V.

(Initial Charge Capacity)

A charge capacity at the first cycle in the above-described charge-discharge test was taken as an initial charge capacity.

(Expansion Rate of Electrode Group)

The charging and discharging described above were taken as one cycle, and the produced batteries were subjected to the first cycle and charging in the second cycle. Each of the batteries prior to being subjected to the charging and discharging and the batteries subjected to the first cycle and charging in the second cycle was disassembled to take out a stack constituted of the positive electrode, the negative electrode, and two separators on both sides of the negative electrode. The batteries were disassembled in an inert gas atmosphere. The obtained stack constituted of the positive electrode, the negative electrode, and the separators was washed with dimethyl carbonate and then dried, and the thickness of the stack was measured. The thickness of the stack was measured with use of a Peacock digital thickness gauge G2-205M. The thickness was measured at five arbitrarily selected points on the stack, and an arithmetic average of the five measured values was taken as an average thickness. Then, thicknesses of the two substrates and thicknesses of the two heat-resistant layers were subtracted from the average thickness to obtain an average thickness X. The percentage (%) of the average thickness X in the second cycle to the average thickness X prior to the charging and discharging was taken as an expansion rate of the electrode group. That is, the expansion rate (%) of the electrode group is the percentage of the average thickness X in the second cycle when the average thickness X prior to the charging and discharging is taken as 100%.

(Nail Penetration Test)

Each of the above-described batteries was charged at a constant current of 0.1 C in an environment at 25° C. until the battery voltage reached 4.3 V. Next, the tip of a wire nail (diameter: 1 mm) was driven into a central portion of a side surface of the charged sample at a speed of 0.1 mm/sec in the environment at 25° C., and when the wire nail moved 5 mm after penetrating through the case, the wire nail was stopped. A generation rate of gas generated from the battery at this time was measured. The generation rate of gas was calculated based on a derivative value of pressure measured using a pressure sensor.

Table 1 shows some of the production conditions and evaluation results of the batteries. In Table 1, initial charge capacities are shown as relative values when the initial charge capacity of the battery C1 is taken as 100. Also, in Table 1, gas generation rates are shown as relative values when the gas generation rate of the battery C2 is taken as 100. The higher the initial charge capacity, the better. The lower the expansion rate of the electrode group, the better. The lower the gas generation rate, the better.

TABLE 1

| Battery | Spacer: Formed on | Spacer: Pattern | Spacer: Average height (μm) | Heat-resistant layer | Initial charge capacity (relative value) | Electrode group expansion rate (%) | Gas generation rate (relative value) |
|---|---|---|---|---|---|---|---|
| A1 | Separator | Honeycomb | 30 | Provided | 114 | 107 | 19 |
| A2 | Separator | Stripe | 30 | Provided | 114 | 118 | 31 |
| C1 | Positive electrode | Honeycomb | 30 | Provided | 100 | 108 | 56 |
| C2 | Separator | Honeycomb | 30 | Not provided | 114 | 107 | 100 |
| C3 | Separator | Honeycomb | 10 | Provided | 114 | 125 | 21 |
| C4 | | Not provided | | Provided | 118 | 133 | 42 |

The batteries A1 to A2 are batteries according to the present disclosure, and the batteries C1 to C4 are batteries of Comparative Examples. The batteries A1 and A2 had high initial charge capacities, low expansion rates of the electrode group, and low gas generation rates. On the other hand, the gas generation rate was high in the battery C1, in which spacers were formed on the positive electrode, and the battery C4 produced using a separator not including the heat-resistant layer. The expansion rate of the electrode group was extremely high in the battery C3, in which the average height of the spacer was smaller than the sum of the thickness of the substrate and the thickness of the heat-resistant layer, and in the battery C4 produced using a separator not including the spacer. The expansion rate of the electrode group and the gas generation rate were lower in the battery A1, in which the spacer included in the separator had a honeycomb pattern, than in the battery A2, in which the spacer included in the separator had a stripe pattern.

INDUSTRIAL APPLICABILITY

The present disclosure is applicable to a lithium secondary battery. For example, a lithium secondary battery according to the present disclosure is applicable to electronic devices such as cellular phones, smart phones, and tablet terminals, electric vehicles including hybrids and plug-in hybrids, and home storage battery systems combined with a solar cell.

Although the present invention has been described in terms of the presently preferred embodiments, such a disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications that fall within the true spirit and scope of the invention.

REFERENCE SIGNS LIST

10: lithium secondary battery
11: positive electrode
12: negative electrode
14: electrode group
14*s*: space
50: separator
51: substrate
51*a*, 51*b*: main surface
52: heat-resistant layer
53: spacer
53*a*: protrusion

The invention claimed is:

1. A lithium secondary battery comprising:
a positive electrode;
a negative electrode;
a separator disposed between the positive electrode and the negative electrode; and
a non-aqueous electrolyte having lithium ion conductivity,
wherein the negative electrode is an electrode on which lithium metal is deposited during charging and from which the lithium metal dissolves during discharging,
the separator includes a substrate, a heat-resistant layer, and a spacer,
the heat-resistant layer is formed on at least one main surface selected from two main surfaces of the substrate,
the spacer is disposed on the positive electrode side with respect to the substrate and the heat-resistant layer, and
an average height of the spacer is larger than a sum of an average thickness of the substrate and an average thickness of the heat-resistant layer.

2. The lithium secondary battery according to claim 1,
wherein the heat-resistant layer is formed on the positive electrode side main surface of the two main surfaces of the substrate, and
the spacer is formed on the heat-resistant layer.

3. The lithium secondary battery according to claim 1,
wherein the spacer includes a non-porous structure through which lithium ions do not pass.

4. The lithium secondary battery according to claim 1,
wherein an area of the spacer is 30% or less of an area of the separator.

5. The lithium secondary battery according to claim 1,
wherein the spacer includes line-shaped protrusions.

6. The lithium secondary battery according to claim 5,
wherein the line-shaped protrusions are mesh-shaped protrusions.

7. The lithium secondary battery according to claim 5,
wherein the line-shaped protrusions form a shape obtained by combining polygons in a plan view.

8. The lithium secondary battery according to claim 5,
wherein the line-shaped protrusions form a honeycomb shape in a plan view.

9. The lithium secondary battery according to claim 1,
wherein a first resin constituting the spacer has a higher heat resistance than a second resin constituting the substrate.

10. The lithium secondary battery according to claim 1,
wherein the heat-resistant layer contains a polymer and inorganic particles.

11. The lithium secondary battery according to claim 10,
wherein the inorganic particles include first particles made of a phosphate containing lithium.

12. The lithium secondary battery according to claim 11,
wherein the inorganic particles include the first particles and second particles made of a material other than a phosphate, and
the heat-resistant layer includes a first layer containing the first particles and a second layer containing the second particles.

13. The lithium secondary battery according to claim 1,
wherein the non-aqueous electrolyte contains $LiBF_2(C_2O_4)$.

* * * * *